(12) United States Patent
Sohde et al.

(10) Patent No.: US 6,452,769 B1
(45) Date of Patent: Sep. 17, 2002

(54) ELECTRICAL POWER DISTRIBUTION INSTALLATION FOR ELECTRICAL POWER SYSTEM

(75) Inventors: Toshio Sohde, Yokohama; Takashi Sakurai, Saitama, both of (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/391,466

(22) Filed: Sep. 8, 1999

(30) Foreign Application Priority Data

Dec. 22, 1998 (JP) .......................................... 10-363633

(51) Int. Cl.⁷ ................................................ H02H 3/00
(52) U.S. Cl. .......................... 361/62; 361/47; 307/18; 307/51
(58) Field of Search ........................... 361/62, 63, 65, 361/67, 54, 57, 56, 44, 47; 307/17, 19, 18, 21, 29, 31, 33, 51, 84, 85, 86, 87, 97, 100, 125, 126

(56) References Cited

U.S. PATENT DOCUMENTS

| | | | |
|---|---|---|---|
| 5,777,842 A | 7/1998 | Tsukushi et al. | 361/603 |
| 5,886,417 A | 3/1999 | Oka et al. | 290/52 |
| 6,067,217 A * | 5/2000 | Kida et al. | 361/58 |

OTHER PUBLICATIONS

Donald Beeman, editor, An Industrial Power Systems Handbook, McGraw Hill Book Co., 1995, pp. 370–375, No month.

* cited by examiner

*Primary Examiner*—Ronald W. Leja
(74) *Attorney, Agent, or Firm*—Foley & Lardner

(57) ABSTRACT

An apparatus and method applicable to an electric power distribution installation, the electrical power distribution installation comprising: at least one main common bus bar; a plurality of main transformers, each main transformer being configured to step down a received power supply voltage and to supply the stepped down power supply voltage to a load via the main common bus bar; and a plurality of power generators, each power generator being connected to the main common bus bar, and the apparatus comprising: a first grounding device including at least one grounding transformer connected to the main common bus bar, a neutral point of the grounding transformer being grounded in a form of a predetermined low impedance grounding; and a second grounding device connected to each neutral point of the power generators to always ground each neutral point directly in a form of a predetermined high resistance grounding.

15 Claims, 3 Drawing Sheets

ELECTRICAL POWER DISTRIBUTION INSTALLATION FOR ELECTRICAL POWER SYSTEM

BACKGROUND OF THE INVENTION a) Field of the Invention

The present invention relates to an electrical power distribution installation and, more particularly, to apparatus and method for grounding and protecting the electrical power distribution installation such as a power station, sub-station, and/or a power generation installation in normal service.

b) Description of the Related Art

FIG. 1 shows a skeleton diagram representing a previously proposed electric power distribution installation.

As shown in FIG. 1, two main transformers MT1 and MT2 are used to step down respectively corresponding power supply voltages from respective feeders connected to receive powers L1 and L2 into main common bus bars BUS-A and BUS-B, each of 11 kV class.

Respective loads LOADs receive the stepped down power supply voltages from the respectively connected main common bus bars BUS-A and BUS-B.

An interconnecting circuit breaker 52AB which is normally closed serves to interconnect one of the main common bus bars BUS-A with the other main common bus bar BUS-B. Each main common bus bar BUS-A and BUS-B supplies the electric power to a corresponding load connected to a low-voltage bus bar via a corresponding transformer T11 and T21.

The other main bus bar BUS-B is connected directly to a generator common bus bar BUS-G via an interconnection feeder without passing through a step-down or step-up transformer.

The generator common bus bar BUS-G is connected to four generators G1, G2, G3, and G4. Each generator G1 through G4 can be disconnected from the generator common bus bar BUS-G by means of a corresponding circuit breaker 52G1, 52G2, 52G3, and 52G4. Each main transformer MT1 and MT2 can be disconnected from the corresponding main common bus bars BUS-A and BUS-B by means of corresponding circuit breakers 52S1 and 52S2. It is noted that each load can be disconnected from each corresponding main common bus bar BUS-A and BUS-B by means of corresponding circuit breakers as shown in FIG. 1.

A grounding device is installed in such a power distribution installation as shown in FIG. 1.

That is to say, the grounding device includes: a neutral grounding resistors NGR-1 and NGR-2, each grounding a neutral point of a star connection of a secondary winding of the corresponding main transformer MT1 or MT2; and a neutral grounding resistor grounding each neutral point of the generators G1 through G4 via a corresponding (vacuum) switch VS1, VS2, VS3, and VS4.

SUMMARY OF THE INVENTION

In the previously proposed grounding system described in the BACKGROUND OF THE INVENTION, suppose that a rating of each grounding resistor NGR-1, NGR-2, and NGR-G is 300 A-10 s.

If all of the grounding resistors NGR-1, NGR-2, and NGR-G are operated, a 900 A resistance grounding system can be constituted in the power system of FIG. 1.

However, if a failure in the feeder connected to the main transformer MT1 occurs so that the current breaker 52S1 interconnected to the secondary winding of the main transformer MT1 trips, the grounding device, i.e., the neutral grounding resistor NGR-1 is disconnected from the power system. Consequently, the grounding system is changed to a 600 A resistance grounding system in the power system.

In addition, if the failure occurs in the main transformer MT1 and, during a repair or exchange (replacement) of the transformer MT1, a failure in the generator common bus bar BUS-G occurs, the grounding device, i.e., the neutral grounding resistor NGR-G is also disconnected (separated) from the power system so that the grounding system is changed to a 300 A resistance grounding system.

If an electrical service interruption in a primary side of the main transformers MT1 and MT2, only the generators G1 through G4 need to continue to operate the power system through the 300 A resistance grounding system.

In the way described above, the change of the resistance grounding system due to the separation of each or any of the neutral grounding resistors from the power system causes changes in a ground fault detection sensitivity and a ground fault detection time in a protective relay system and often allows a coordinate protection in the power system not to be maintained.

It is therefore an object of the present invention to provide an electrical power distribution installation having an improved resistance grounding system and a protection system which are stable against a failure occurrence in an internal power system with no influence or small influence of a coordinate protection.

According to one aspect of the present invention, there is provided with an electric power distribution installation comprising: at least one main common bus bar; a plurality of main transformers, each main transformer being configured to step down a received power supply voltage and to supply the stepped down power supply voltage to a load via the main common bus bar; a plurality of power generators, each power generator being connected to the main common bus bar; a first grounding device including at least one grounding transformer connected to the main common bus bar, a neutral point of the grounding transformer being grounded in a form of a predetermined low impedance grounding; and a second grounding device connected to each neutral point of the power generators to always ground each neutral point directly in a form of a predetermined high resistance grounding.

According to another aspect of the present invention, there is provided with a method applicable to an electric power distribution installation, the electrical power distribution installation comprising: at least one main common bus bar; a plurality of main transformers, each main transformer being configured to step down a received power supply voltage and to supply the stepped down power supply voltage to a load via the main common bus bar; and a plurality of power generators, each power generator being connected to a generator common bus bar and the generator common bus bar being connected to the main common bus bar, and the method comprising: providing a first grounding device including at least one grounding transformer connected to the main common bus bar, a neutral point of the grounding transformer being grounded in a form of a predetermined low impedance grounding; and providing a second grounding device connected to each neutral point of the power generators to always ground each neutral point directly in a form of a predetermined high resistance grounding.

In the previously proposed electrical power distribution installation shown in FIG. 1, the four generators G1 through G4 are enabled to be a parallel operation and their one neutral point is grounded via their corresponding circuit breaker (switch) VS1 through VS4 by means of the single neutral grounding resistor NGR-G.

Reasons for adopting such a grounding method as described above and problems occurring therein will be described below.

(a) When each neutral point of the four generators G1 through G4 is short-circuited without an impedance, a zero-phase voltage component of a generated voltage of each generator G1 through G4 generates a zero-phase current at a corresponding neutral point so that an overheat of the respective generators G1 through G4 occurs.

To eliminate such a deficiency as described above, with any one of the vacuum switches VS1 through VS4 turned on in the normal service, only one of the four generators G1 through G4 which is connected to the turned-on vacuum switch is connected to the grounding resistor NGR-G.

(b) Each generator G1 through G4 is required for a regular inspection. If one of the four generators G1 through G4 which is connected to the grounding resistor NGR-G undergoes the inspection, it is necessary to switch the connection of the grounding resistor to another of the generators with no interruption of the power supply. At this time, any two of the four vacuum switches VS1 through VS4 are temporarily turned on in parallel to each other so as to prevent the grounding resistor from being separated from the generators even at an instantaneous time.

In addition, if a failure occurs in the feeder related to one of the generators G1 through G4 which is connected to the grounding resistor, it is necessary to connect automatically the grounding resistor to the neutral point of any other generator before the failed generator is separated from the grounding resistor.

For such a reason as described above, an automatic switching device or a normal operation by an operator is required which carries out a switching of the connection of the grounding resistor with any one of all of the generators always connected to the grounding resistor and with no occurrence in an instantaneous separation of the grounding resistor from the other of the generators during the inspection or during the failure occurrence.

(c) If, during the parallel operation of the generators, the operation of any one of the generators has been stopped due to the failure in the feeder connected to the corresponding generator, the circuit breaker remains in an off state which is installed between the common bus bar and the generator when the failed generator is recovered, the recovered generator is operated under a no-load driving condition. After the generated voltage is established, the connected vacuum switch is turned on to connect the recovered generator to the corresponding common bus bar.

If the ground fault occurs during the no-load operation of the recovered generator, a resonance phenomenon often occurs due to a reactance in a ground fault point and a capacitance between the ground and the feeder connected to the recovered generator. This resonance phenomenon causes a high voltage surge so that a dielectric breakdown may occur in any generator and/or a switchboard.

It is another object of the present invention to provide grounding method and protection method for the electric power distribution installation which require no switch of the connection of the grounding resistor to any other of the generators and assure the protection of the generators in the power distribution installation.

According to a still another aspect of the present invention, there is provided with a method applicable to an electric power distribution installation, the electrical power distribution installation comprising: at least one main common bus bar; a plurality of main transformers, each main transformer being configured to the stepped down power supply voltage to a load via the main common bus bar; and a plurality of power generators, each power generator being connected to a generator common bus bar and the generator common bus bar being connected providing a first grounding device including at least one grounding transformer connected to the main common bus bar, a neutral point of the grounding transformer being grounded in a form of a predetermined low impedance grounding; providing a second grounding device connected to each neutral point of the power generators to always ground each neutral point directly in a form of a predetermined high resistance grounding; providing a first protecting device including a ground over-current relay to a secondary feeder connecting a secondary winding of each main transformer to the main common bus bar and being enabled to separate the corresponding one of the main transformers from the main common bus bar; providing a second protecting device including a ground directional relay interposed in a feeder connected to the grounding transformer to detect a failure in the feeder connected to the grounding transformer; and providing a third protecting device including a ground directional relay to detect a ground fault in each corresponding power generator to be enabled to separate the ground fault occurring power generator from the main common bus bar.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 2:
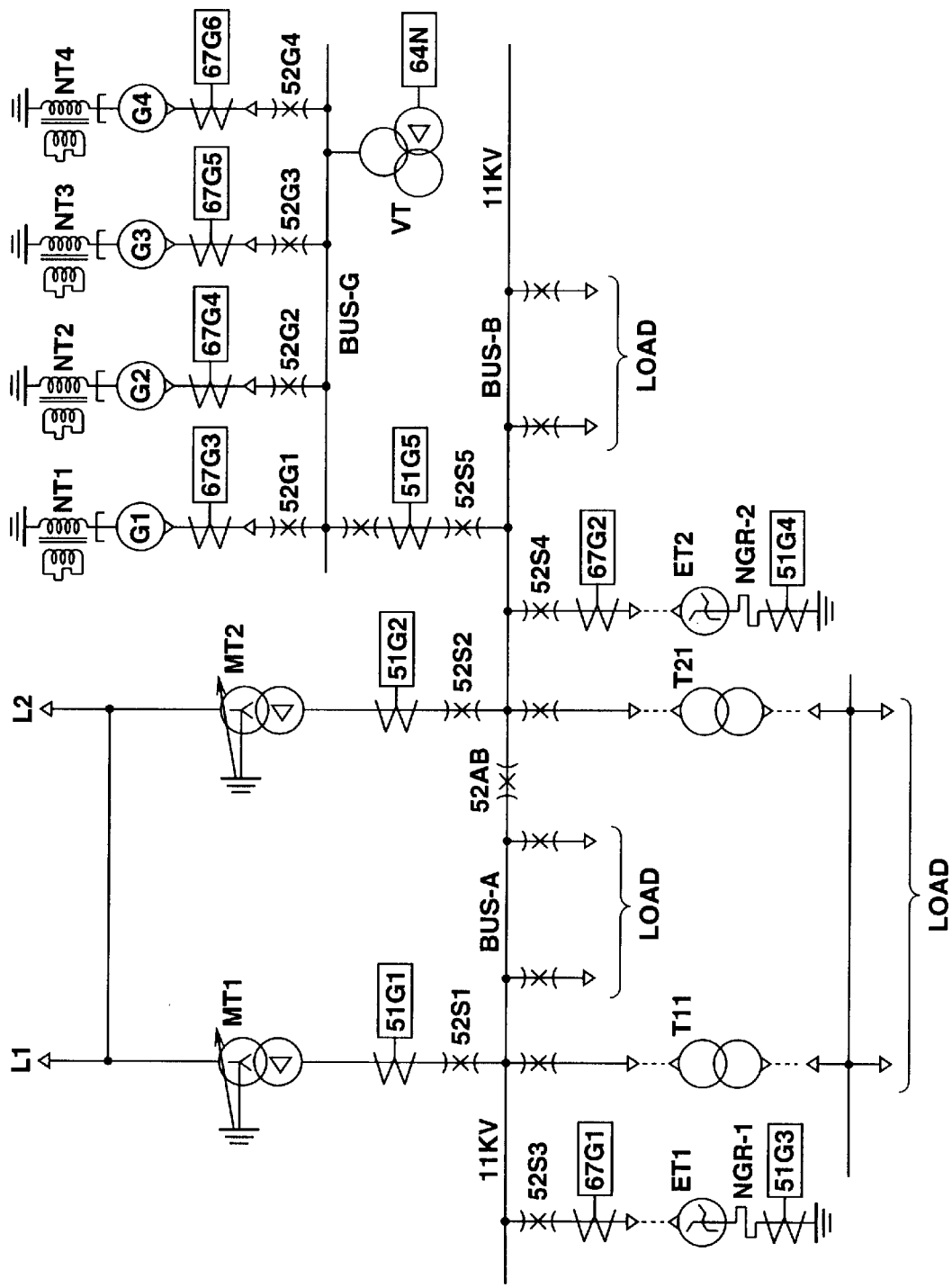
FIG. 2 is a skeleton diagram of a preferred embodiment of an electrical power distribution installation for an electric power system according to the present invention.

FIG. 2 shows a skeleton diagram of a preferred embodiment of an electrical power distribution installation according to the present invention.

A difference point from a previously proposed electrical power distribution installation shown in FIG. 1 will chiefly be described below.

In FIG. 2, each of the main common bus bars BUS-A and BUS-B is grounded in a form of a low resistance grounding (so called, a low impedance grounding) by means of a corresponding one of resistors NGR-1 and NGR-2 via a corresponding one of breakers 52S3 and 52S4 and a corresponding one of neutral grounding transformers ET1 and ET2.

A neutral point current to be caused to flow through each grounding resistor NGR-1 and NGR-2 is rated to be, for example, equal to 100 A or larger.

It is noted that a switch gear or circuit breaker is interposed in a feeder connected to each corresponding one of grounding transformers ET1 and ET2 so that the number of the grounding transformers to be turned on to be interconnected to the corresponding one or two of the main common bus bars can be controlled to enable a modification of the grounding system of the power system shown in FIG. 2.

Figure 1:
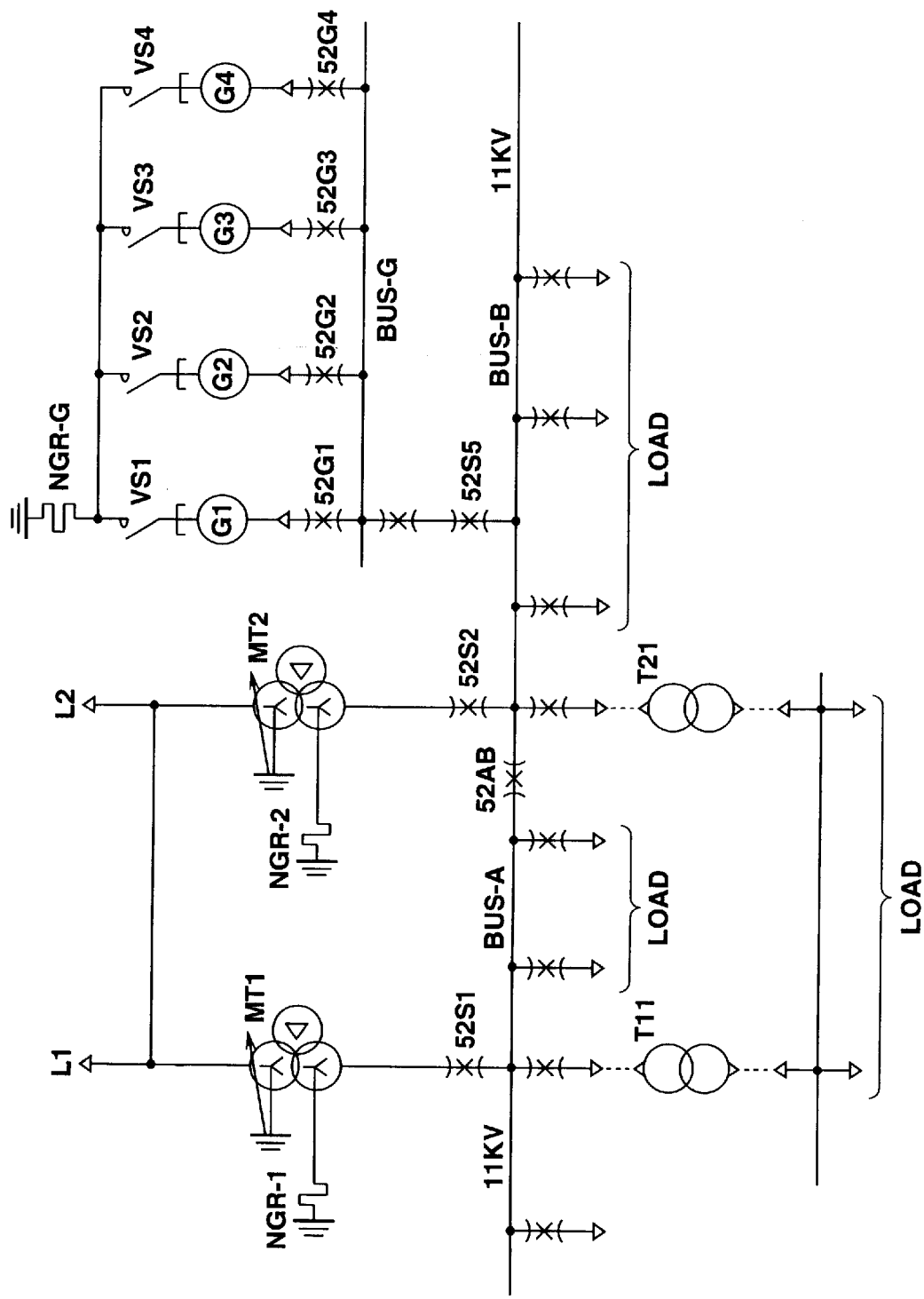
FIG. 1 is a skeleton diagram of a previously proposed electrical power distribution installation described in the BACKGROUND OF THE INVENTION.

It is also noted that, in the previously proposed power distribution installation shown in FIG. 1, each secondary winding neutral point of the main transformers MT1 and MT2 is grounded.

In addition, each neutral point of the four generators G1 through G4 is grounded by means of a high impedance resistor (via single-phase transformers NT1 through NT4 and the secondary resistor).

Alternatively, each neutral point thereof may directly be grounded by means of a corresponding one of neutral grounding resistors with a high resistance.

It is noted that, in the previously proposed power distribution installation in FIG. 1, each neutral point of the four generators G1 through G4 is grounded via the corresponding one of the (vacuum) switches VS1 through VS4.

Each grounding resistance between the corresponding one of the respective neutral points of the generators G1 through G4 and the ground is determined in such a manner that the neutral point current flowing through the corresponding grounding resistor is a small current (about 10 A) having a degree to which an excessive voltage is not developed across any generator even with a resonance condition established when a one-line ground occurs in the corresponding feeder to be connected to the corresponding one of the generators G1 through G4.

This grounding device serves merely to prevent the occurrence of the resonance phenomenon and constitutes basically a non-grounding system. Consequently, the influence of the different number of the turned on generators on the grounding system can be eliminated.

In addition, in the embodiment shown in FIG. 2, the switches VS1 through VS4 connected to the respective neutral points of the generators (shown in FIG. 1) can be eliminated.

That is to say, although the respective generators G1 through G4 are grounded by means of the high impedance neutral grounding resistors (grounding transformers NT1 through NT4) in the embodiment to prevent the occurrence of the resonance phenomenon, the grounding devices constitute the non-grounding system when the circuit breaker of the respective generator feeder is open. The respective common bus bars BUS-A and BUS-B are interconnected as a low impedance grounding system). When the power distribution installation shown in FIG. 2 is viewed from each load, it can always be viewed as the low impedance grounding system.

In the above-described grounding system, such protective relays as will be described below are installed to protect the power system and the generators if the ground fault occurs.

(a) Protection of the secondary feeders of the respective main transformers MT1 and MT2 from the occurrence of the ground fault.

Ground fault over-current relays 51G1 and 51G2 are interposed in respective feeders connected to the secondary windings of the respective main transformers MT1 and MT2.

When the ground fault occurs in one of the feeders connected to the secondary winding of one or each of the main transformers MT1 and MT2, the corresponding one of the ground fault over-current relays 51G1 and 51G2 to separate the ground fault feeder from the power system.

(b) Protection of feeders on the grounding transformers ET1 and ET2 from the occurrence in the ground fault.

Ground fault over-current relays 51G3 and 51G4 are respectively interposed to back up the grounding system and the grounding devices.

(c) Grounding fault detection relays 67G1 and 67G2 are interposed which receives the zero-phase voltages in the feeders connected between the corresponding neutral grounding transformers ET1 and ET2 and the corresponding main common bus bars BUS-A and BUS-B to permit the feeders on the grounding transformers ET-1 and ET-2 to be separated from the power system through the respective circuit breakers 52S3 and 52S4.

(d) Grounding directional relays 67G3, 67G4, 67G5, and 67G6 which receive the zero-phase voltage and zero-phase current from a current transformer are interposed in the feeders connected between the respective generators G1 through G4 and the generator common bus bar BUS-G so that the corresponding breakers 52G1 through 52G4 can serve to separate the feeders individually from the generator common bus bar BUS-G.

It is noted that, in the case where each generator G1 through G4 is directly connected to the main common bus bar BUS-B, the ground directional relays 67G3 through 67G6 installed in the respective feeders for the respective generators G1 through G4.

(e) A ground fault over-current relay 51G5 which receives the zero-phase current is interposed in the feeder connecting the main common bus bar BUS-B to the generator common bus bar BUS-G. The ground fault current flowing from the grounding transformers ET1 and ET2 connected to the main common bus bars BUS-A and BUS-B causes the ground fault over-current breaker 52S5 can serve to separate the feeder connected to the generator common bus bar BUS-G from the main common bus bars BUS-A and BUS-B.

(f) A ground fault over-voltage relay 64N is interposed in an open delta circuit of a transformer VT installed on the generator common bus bar BUS-G. The ground fault over-voltage relay 64N serves to protect the generators G1 through G4 from the occurrence of the ground fault in the generator common bus bar BUS-G which will occur before the generator common bus bar is interconnected to the main common bus bar BUS-B.

An operation of protection for the power system and on the grounding system in the embodiment shown in FIG. 2 will be described below.

(A) Ground fault protection for the secondary feeders of the main transformers MT1 and MT2.

Figure 3:
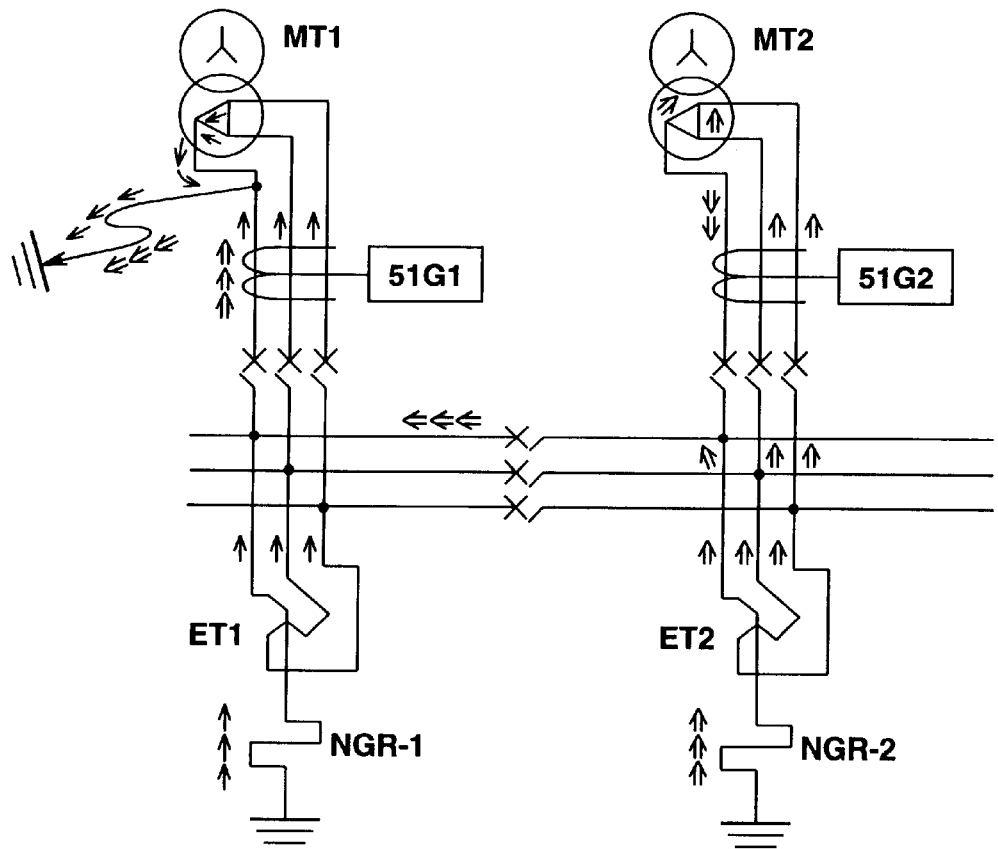
FIG. 3 is an explanatory partial skeleton diagram for explaining a ground fault current of a secondary feeder of a main transformer shown in FIG. 2.

If, during the parallel run of the main transformers MT1 and MT2, for example, the one-line ground occurs in the secondary feeder of one of the main transformers MT1, the ground fault current is developed in a path shown by arrow marks of FIG. 3, the ground fault over-current relay 51G1 located on the secondary winding of the one of the main transformers MT1 trips to separate the main transformer MT1 from the power system so that the sole run of the other main transformer MT2 is switched to be continued to run.

(B) Ground fault protection for the grounding transformers ET1 and ET2.

Figure 4:
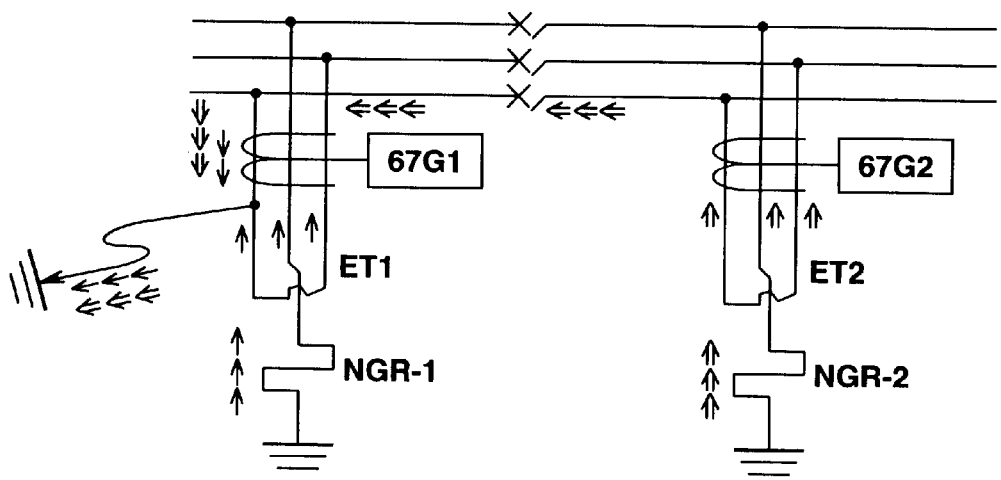
FIG. 4 is an explanatory skeleton diagram for explaining a feeder ground fault current of a grounding transformer shown in FIG. 2.

For example, if the one-line ground occurs in the feeder on the one grounding transformer ET1, the ground fault current is developed in the path shown by the arrow marks in FIG. 4. Whereas the zero-phase current in a downward direction occurs as viewed from the ground directional relay 67G1, the zero-phase current in an upward direction occurs as viewed from the ground directional relay 67G2.

Hence, the ground directional relay 67G1 can detect the feeder at which the ground fault occurs.

In this detection of the ground fault feeder by means of the ground directional relay 67G1, the grounding transformer ET1 can be separated from the main common bus bar BUS-A with the trip of the breaker 52S3, the grounding system of the power system is changed. However, upon the detection of the ground fault feeder, an alarm may preferably be produced through the ground directional relay 67G1 to inform the operator of the ground fault.

The determination of whether the grounding transformer ET1 should be separated is rested on a decision by the operator or the whole power distribution installation shown in FIG. 2 is stopped after a certain period of time has elapsed.

It is noted that for each neutral point current of the grounding transformers ET1 and ET2, the ground fault over-current relays 51G3 and 51G4 are used to back-up the grounding system and grounding devices.

(C) Earth ground fault protection of the interconnection feeder between the main common bus bar BUS-B and the generator bus bar BUS-G.

The ground fault over-current relay 51G5 is operated so as to protect the interconnection feeder from the ground fault in response to the ground fault current flowing through the grounding transformer connected to the main common bus bar.

(D) Grounding protection of the generator connected feeders.

For example, in a case where the one-line ground occurs in the feeder connected to the generator G1, the ground directional relay 67G3 detects the ground fault according to the magnitude of the zero-phase current from the feeder of the generator G1 and causes the circuit breaker 52G1 to be tripped so that only the generator G1 can be separated from the generator common bus BUS-G.

In this protection operation, even under a situation wherein the interconnection feeder between the generator common bus bar BUS-G and the main common bus bar BUS-B is disconnected due to the detection of the ground fault using a zero-phase current transformer (so-called, a balance core CT), the ground directional relay can detect in which of the feeders connected to the respectively corresponding generators the ground fault occurs. In addition, in a case where the ground fault occurs in any one of the generator feeders during a parallel run of the generators with another external power purchasing generator, the ground fault can accurately be detected without a saturation of the zero-phase current transformer (balance core CT).

(E) Protection of generators

Since the neutral points of the respective generators G1 through G4 are always grounded (always means at any time) by means of high impedance resistor (via single-phase transformers NT1 through NT4 and the secondary resistors), the overheat of each or any one of the generators G1 through G4 due to their corresponding neutral point currents (the zero-phase circulation current) can be prevented.

In addition, it is not necessary to switch the neutral point of each generator into the ground as described in the SUMMARY OF THE INVENTION with reference to the previously proposed power distribution during the regular inspection of the generators or during the failure occurrence in the feeder and the inspection operation can be simplified.

Even in a case where the plurality of generators G1 through G4 are failed, the feeder for any one of the generators has failed, and the ground fault occurs during the non-load driving to recover one of the generators to which the failed feeder is connected, the grounding device (single-phase transformers or high resistance grounding) can prevent the resonance grounding) can prevent the resonance voltage from being developed in the corresponding generator and can prevent the dielectric breakdown from occurring in each generator or switchboard.

As described hereinabove, in the power distribution installation according to the present invention, the main common bus bars are grounded in the form of the low resistance grounding via the neutral ground transformers and each generator is grounded by the high impedance resistor to prevent the resonance phenomenon. Hence, the change in the grounding current can be eliminated or reduced even when the change in the number of parallel banks due to the separation of one of the main transformers, the stable grounding system can be achieved even if the failure occurs in the power system of the electrical power distribution installation, and the grounding system cannot give an influence on the coordinate protection.

In addition, since the secondary neutral point in each of the main transformers MT1 and MT2 is not used, the secondary winding thereof can be formed in a delta connection, and in a case where a primary winding thereof can be formed in a star connection, and a drawing out of the corresponding neutral point is required, a cost reduction according to no necessity of a stable winding can be achieved.

Furthermore, since each neutral point of the generators is always connected through the corresponding resonance preventing resistor, the neutral point switches or its switching control devices are not needed.

The entire contents of Japanese Patent Application P10-363633 (filed in Japan on Dec. 22, 1998) are incorporated herein by reference.

Although the present invention has been described by reference to certain embodiments described above, the present invention is not limited to the embodiments described above. Modifications and variations of the embodiments will occur to those skilled in the art in light of the above teachings.

The scope of the present invention is defined with reference to the following claims.

What is claimed is:

1. An electric power distribution installation comprising:
   at least one main common bus bar;
   a plurality of first and second main transformers, each of the first main transformers being configured to step down a received power supply voltage at a corresponding primary winding thereof from an external power supply and to supply the stepped down power supply voltage to the main common bus bar and each of the second main transformers being configured to supply the stepped down power supply voltage on the main bus bar to a load;
   a plurality of power generators, each power generator being connected to the main common bus bar;
   a first grounding device including at least one grounding transformer connected to a secondary winding of the corresponding one of the first main transformers via the main common bus bar, a neutral point of the grounding transformer being grounded in a form of a predetermined low impedance grounding; and a second grounding device connected to each neutral point of the power generators to always ground each neutral point directly in a form of a predetermined high resistance grounding.

2. An electric power distribution installation as claimed in claim 1, wherein each power generator is connected to the main common bus bar via a generator common bus bar and an interconnection feeder connecting the generator common bus bar to the main common bus bar.

3. An electric power distribution installation as claimed in claim 2, wherein the first grounding device further includes a neutral grounding resistor having the predetermined low resistance and connected to the neutral point of the grounding transformer and the second grounding device includes a plurality of single-phase transformers, each single-phase transformer having the predetermined high resistance and connected between each corresponding neutral point of the power generators and the ground.

4. An electric power distribution installation as claimed in claim 3, wherein the main common bus bar includes a plurality of same main common bus bars, each of the first main transformers having the secondary winding connected to a corresponding one of the same main common bus bars via a secondary feeder and which further comprises a first protecting device including a ground over-current relay interposed in each of the secondary feeders of the respective first main transformers to be enabled to disconnect the corresponding one of the secondary feeders connected from the corresponding one of the same main common bus bars when a ground fault occurs in any one of the secondary feeders.

5. An electric power distribution installation as claimed in claim 4, wherein the grounding transformer includes a plurality of same grounding transformers, each grounding transformer being connected to the corresponding one of the same main common bus bars, and which further comprises a second protecting device including a ground directional relay interposed in each feeder connected to the corresponding one of the same grounding transformers to detect a failure in the corresponding one of the feeders.

6. An electric power distribution installation as claimed in claim 5, wherein the interconnection feeder connected to the generator common bus bar is connected to the corresponding one of the same main common bus bars and which further comprises a third protecting device including a plurality of ground directional relays each ground directional relay being interposed in a corresponding one of feeders connecting the generator common bus bar to the respective generators to detect a ground fault in the corresponding one of the power generators and being enabled to disconnect the ground fault detected power generator from the generator common bus bar.

7. An electric power distribution installation as claimed in claim 6, wherein a ground fault over-voltage relay is interposed in an open delta circuit of a transformer connected to the generator common bus bar to protect each power generator from the ground fault when the ground fault occurs in the generator common bus bar before the generator common bus bar is connected to the main common bus bar.

8. An electric power distribution installation as claimed in claim 7, which further comprises a ground over-current relay which is interposed in the interconnection feeder and is operated in response to a ground fault current flowing therethrough from one of the grounding transformer connected to the corresponding one of the same common bus bars.

9. An electric power distribution installation as claimed in claim 4, wherein the first protecting device further includes current breakers, each current breaker being interposed between the corresponding one of the ground over-current relays and the corresponding one of the same main common bus bars to separate the corresponding one of the first main transformers from the corresponding one of the same common bus bars.

10. An electric power distribution installation as claimed in claim 5, which further includes a plurality of ground over-current relays, each ground over-current relay being interposed between the corresponding one of the neutral grounding resistors and the ground.

11. An electric power distribution installation as claimed in claim 10, wherein the second protecting device further includes a plurality of current breakers, each current breaker being interposed between the corresponding one of the same main common bus bars and the corresponding one of the ground directional relays to separate the corresponding one of the grounding transformers from the corresponding one of the same main common bus bars when the corresponding one of the ground directional relays trips in response to a direction of the ground current when a one-line ground occurs in one of the feeders connected to the corresponding one of the grounding transformers.

12. An electric power distribution installation as claimed in claim 6, wherein the third protecting device further includes a plurality of current breakers, each current breaker being interposed between the corresponding one of the ground directional relays connected to the corresponding one of the generators and the generator common bus bar to separate the corresponding one of the power generators from the generator common bus bar when the corresponding one of the ground directional relays trips in response to the ground current flowing therethrough when a one-line ground occurs in the corresponding feeder connected to the corresponding one of the power generators.

13. A method applicable to an electric power distribution installation, the electrical power distribution installation comprising:

at least one main common bus bar;

a plurality of first and second main transformers, each of the first main transformers being configured to step down a received power supply voltage at a corresponding primary winding thereof from an external power supply and to supply the stepped down power supply voltage to the main common bus bar and each of the second main transformers being configured to supply the stepped down power supply voltage on the main bus bar to a load; and a plurality of power generators, each power generator being connected to a generator common bus bar and the generator common bus bar being connected to the main common bus bar, and the method comprising:

providing a first grounding device including at least one grounding transformer connected to a secondary winding of the corresponding one of the first main transformers via the main common bus bar, a neutral point of the grounding transformer being grounded in a form of a predetermined low impedance grounding; and providing a second grounding device connected to each neutral point of the power generators to always ground each neutral point directly in a form of a predetermined high resistance grounding.

14. A method applicable to an electric power distribution installation, the electrical power distribution installation comprising:

at least one main common bus bar;

a plurality of first and second main transformers, each of the first main transformers being configured to step down a received power supply voltage at a corresponding primary winding thereof from an external power supply and to supply the stepped down power supply voltage to the main common bus bar and each of the second main transformers being configured to supply the stepped down power supply voltage on the main bus bar to a load; and a plurality of power generators, each power generator being connected to a generator common bus bar and the generator common bus bar being connected to the main common bus bar, and the method comprising:

providing a first grounding device including at least one grounding transformer connected to a secondary winding of the corresponding one of the first main transformers via the main common bus bar, a neutral point of the grounding transformer being grounded in a form of a predetermined low impedance grounding;

providing a first protecting device including a ground over-current relay to a secondary feeder connecting a secondary winding of each first main transformer to the main common bus bar and being enabled to separate the corresponding one of the first main transformers from the main common bus bar;

providing a second protecting device including a ground directional relay interposed in a feeder connected to the grounding transformer to detect a failure in the feeder connected to the grounding transformer; and providing a third protecting device including a ground directional relay to detect a ground fault in each corresponding power generator to be enabled to separate the ground fault occurring power generator from the main common bus bar.

15. An electric power distribution installation comprising:

at least one main common bus bar;

a plurality of main transformers, each main transformer being configured to step down a received power supply voltage and to supply the stepped down power supply voltage to a load via the at least one main common bus bar;

a first grounding device comprising at least one grounding transformer connected to the at least one main common bus bar, a neutral point of a star connection of the grounding transformer being grounded in a form of a predetermined low impedance grounding; and a second grounding device comprising a plurality of transformers, each of the plurality of transformers having a primary winding and a secondary winding, each of the primary winding and the secondary winding having a first end and a second end, one end of each primary winding of the respective transformers of the second grounding device thereof being directly connected to a corresponding neutral point of the power generators, the other end of each primary winding of the respective transformers of the second ground device being grounded and each end of the secondary windings of the respective transformers of the second grounding device being interconnected to form a predetermined high impedance grounding.

* * * * *